US006689208B1

(12) United States Patent
Brothers

(10) Patent No.: US 6,689,208 B1
(45) Date of Patent: Feb. 10, 2004

(54) LIGHTWEIGHT CEMENT COMPOSITIONS AND METHODS OF CEMENTING IN SUBTERRANEAN FORMATIONS

(75) Inventor: Lance E. Brothers, Chickaska, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 29 days.

(21) Appl. No.: 10/454,080

(22) Filed: Jun. 4, 2003

(51) Int. Cl.[7] .................. C04B 7/34; E21B 33/38; E21B 33/14
(52) U.S. Cl. ............... 106/794; 106/793; 106/811; 106/681; 166/292; 166/293; 405/266; 405/267; 507/140; 507/269
(58) Field of Search ............... 106/793, 794, 106/811, 681; 166/292, 293; 405/266, 267; 507/140, 269

(56) References Cited

U.S. PATENT DOCUMENTS

| | | | |
|---|---|---|---|
| 3,359,225 A | 12/1967 | Weisend | 260/29.6 |
| 4,015,991 A | 4/1977 | Persinski et al. | 106/90 |
| 4,234,344 A | 11/1980 | Tinsley et al. | 106/88 |
| 4,460,052 A | 7/1984 | Gockel | 175/72 |
| 4,498,995 A | 2/1985 | Gockel | 252/8.5 LC |
| 4,515,635 A | 5/1985 | Rao et al. | 106/90 |
| 4,555,269 A | 11/1985 | Rao et al. | 106/90 |
| 4,676,317 A | 6/1987 | Fry et al. | 166/293 |
| 4,703,801 A | 11/1987 | Fry et al. | 166/293 |
| 4,818,288 A | 4/1989 | Aignesberger | 106/90 |
| 5,263,542 A | 11/1993 | Brothers | 166/293 |
| 5,340,397 A | 8/1994 | Brothers | 106/727 |
| 5,725,652 A * | 3/1998 | Shulman | 106/677 |
| 6,063,738 A | 5/2000 | Chatterji et al. | 507/269 |
| 6,156,808 A | 12/2000 | Chatterji et al. | 516/116 |
| 6,220,354 B1 | 4/2001 | Chatterji et al. | 166/293 |
| 6,241,815 B1 | 6/2001 | Bonen | 106/735 |
| 6,268,406 B1 | 7/2001 | Chatterji et al. | 523/130 |
| 6,308,777 B2 | 10/2001 | Chatterji et al. | 166/293 |
| 6,457,524 B1 | 10/2002 | Roddy | 166/293 |
| 6,500,252 B1 | 12/2002 | Chatterji et al. | 106/644 |
| 6,516,883 B1 | 2/2003 | Chatterji et al. | 166/293 |
| 6,569,232 B2 | 5/2003 | Castro et al. | 106/644 |

OTHER PUBLICATIONS

Halliburton brochure entitled "CFR–3 Cement Friction Reducer Dispersant" dated 1998. (no month).
Halliburton brochure entitled "Halad®–344 Fluid–Loss Additive" dated 1998. (no month).
Halliburton brochure entitled "Halad®–413 Fluid–Loss Additive" dated 1999. (no month).
Halliburton brochure entitled "Halad®–344 Fluid–Loss Additive" dated 2000. (no month).
Halliburton brochure entitled "Spherelite Cement Additive" dated 1999. (no month).

* cited by examiner

Primary Examiner—Anthony J. Green
(74) Attorney, Agent, or Firm—Craig W. Roddy; Carey C. Jordan

(57) ABSTRACT

The present invention provides lightweight cement compositions, and methods for cementing in a subterranean formation using such cement compositions. The cement compositions comprise hydrated lime, vitrified shale, and sufficient water to form a slurry. Optionally, other ingredients may be included in the compositions.

33 Claims, No Drawings

LIGHTWEIGHT CEMENT COMPOSITIONS AND METHODS OF CEMENTING IN SUBTERRANEAN FORMATIONS

BACKGROUND OF THE INVENTION

1. Field of the Invention

The present invention relates to subterranean cementing operations, and more particularly, to lightweight cement compositions, and methods of using such compositions in subterranean well cementing operations.

2. Description of the Prior Art

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surfaces of the pipe string to the walls of the well bore. Hydraulic cement compositions also are used in remedial cementing operations such as plugging highly permeable zones or fractures in well bores, plugging cracks and holes in pipe strings, and the like.

Subterranean formations transversed by well bores are often weak and extensively fractured. In some cases, the formation may be unable to withstand the hydrostatic head pressure normally associated with cement being pumped in the formation. In such cases, the hydrostatic pressure may be sufficient to force cement into the extensive fractures of the formation, which may result in a significant loss of cement into the formation during cementing operations. This loss of cement composition is problematic because, inter alia, less of the cement composition will remain in the annular space to form the protective sheath that bonds the pipe string to the walls of the well bore. Accordingly, fracturing the subterranean formation while cementing is of great concern.

SUMMARY OF THE INVENTION

The present invention provides lightweight cement compositions, and methods for cementing in a subterranean formation using such cement compositions.

One method of the present invention comprises providing a cement composition comprising vitrified shale, hydrated lime, and water; placing this cement composition in a subterranean formation; and allowing the cement composition to set therein.

One embodiment of the cement compositions of the present invention comprises vitrified shale, hydrated lime, and water. Optionally, other additives suitable for cement compositions may be added to the cement compositions of the present invention.

The objects, features and advantages of the present invention will be readily apparent to those skilled in the art upon a reading of the description of the preferred embodiments which follows.

DETAILED DESCRIPTION OF PREFERRED EMBODIMENTS

The present invention provides lightweight cement compositions and methods of utilizing these cement compositions in subterranean cementing operations. While the compositions and methods of the present invention are useful in a variety of subterranean applications, they are particularly useful in well completion and remedial operations, including primary cementing, e.g., cementing casings and liners in well bores, including those in multi-lateral subterranean wells.

The improved cement compositions of the present invention generally comprise: an unhydrated cement comprising hydrated lime and vitrified shale; and water sufficient to make the cement composition a slurry. As referred to herein, hydrated lime will be understood to mean calcium hydroxide ($Ca(OH)_2$). Other additives suitable for use in conjunction with subterranean cementing operations also may be added to these cement compositions if desired. Typically, the cement compositions of the present invention have a density in the range of from about 4 lb/gallon to about 20 lb/gallon. In certain preferred embodiments, the cement compositions of the present invention have a density in the range of from about 8 lb/gallon to about 17 lb/gallon.

The hydrated lime is present in the cement compositions of the present invention in an amount sufficient to form calcium silicate hydrates upon reaction with a source of water and a source of vitrified shale. Calcium silicate hydrates, inter alia, lend strength to cement compositions. More particularly, the hydrated lime is present in the cement composition in an amount in the range of from about 5% to about 20% percent by weight of the unhydrated cement. In certain preferred embodiments, the hydrated lime is present in the cement composition in an amount in the range of from about 10% to about 15% by weight of the unhydrated cement. An example of a suitable hydrated lime is commercially available from Continental Lime, Inc., of Salt Lake City, Utah.

The vitrified shale is present in the cement compositions of the present invention in an amount sufficient to form calcium silicate hydrates upon reaction with a source of water and a source of hydrated lime. More particularly, the vitrified shale is present in the cement composition in an amount in the range of from about 80% to about 95% by weight of the unhydrated cement. In certain preferred embodiments, the vitrified shale is present in the cement composition in an amount in the range of from about 85% to about 90% by weight of the unhydrated cement. An example of a suitable vitrified shale is commercially available under the tradename "PRESSUR-SEAL® FINE LCM" from TXI Energy Services, Inc., in Houston, Tex.

The water utilized in the cement compositions of the present invention can be fresh water, salt water (e.g., water containing one or more salts dissolved therein), brine (e.g., saturated salt water), or seawater. Generally, the water can be from any source provided that it does not contain an excess of compounds, e.g., dissolved organics, that may adversely affect other components in the cement composition. The water may be present in an amount sufficient to form a pumpable slurry. More particularly, the water is present in the cement compositions in an amount in the range of from about 40% to about 90% by weight of the unhydrated cement. In certain preferred embodiments, the water is present in the cement compositions in an amount in the range of from about 40% to about 80% by weight of the unhydrated cement.

Optionally, the cement compositions of the present invention may comprise a means to reduce their densities, including, for example, an expanding additive, microspheres, or the like. For example, the cement compositions of the present invention may be foamed cement compositions wherein an expanding additive that produces a gas within the cement composition has been added. If the cement composition is foamed, foaming agents and/or foam stabilizing agents, or mixtures thereof, may be included in the cement composition in order, inter alia, to facilitate the foaming and/or enhance the cement composition's stability. The foaming agent and/or foam stabilizing agent is generally present in the cement composition in an amount sufficient to provide a stable foamed cement composition. One of ordinary skill in the art with the benefit of this disclosure will recognize the appropriate type of foaming agent and/or foam stabilizing agent for use in a particular application, along with the ranges in which such agent or agents should be incorporated. One of ordinary skill in the art with the benefit of this disclosure will also recognize the proper amount of an expanding additive to use in order to provide a foamed cement composition having a desired density.

Another example of a suitable means to reduce the density of the cement compositions of the present invention is one that employs microspheres. Because the microspheres have specific gravities below about 1.0, their inclusion in a cement composition acts to reduce the overall cement composition's density. Any microspheres that are compatible with a subterranean cement composition, i.e., that are chemically stable over time upon incorporation into the cement, may be used. An example of a suitable microsphere is commercially available from Halliburton Energy Services, Inc., of Houston, Tex., under the tradename "SPHER-ELITE." Where included, the microspheres are present in the cement composition in an amount sufficient to provide a cement composition having a density in a desired range. More particularly, the microspheres may be present in the cement composition in an amount in the range of from about 10% to about 100% by weight of the unhydrated cement.

Additional additives may be added to the cement compositions of the present invention as deemed appropriate by one skilled in the art with the benefit of this disclosure. Examples of such additives include, inter alia, fluid loss control additives, defoamers, dispersing agents, set accelerators, salts, formation conditioning agents, weighting agents, set retarders, and the like.

An example of a cement composition of the present invention comprises: an unhydrated cement comprising 85% vitrified shale by weight and 15% hydrated lime by weight; and 66% water by weight of the unhydrated cement.

An example of a method of the present invention comprises providing a cement composition that comprises hydrated lime, vitrified shale, and water; placing this cement composition in a subterranean formation; and allowing the cement composition to set therein.

To facilitate a better understanding of the present invention, the following examples of some of the preferred embodiments are given. In no way should such examples be read to limit the scope of the invention.

EXAMPLE 1

A test sample of a preferred embodiment of the cement compositions of the present invention was made. To prepare the sample, an unhydrated cement was prepared comprising 85% vitrified shale by weight and 15% hydrated lime by weight. The unhydrated cement was then hydrated by adding 66% water by weight of the unhydrated cement. The sample was then subjected to testing per API Specification 10-B. The results are set forth in Table 1 below.

TABLE 1

| Test Temperature | Thickening Time (hours) | 24 Hour Compressive Strength (psi) |
| --- | --- | --- |
| 80° F. | 15+ | not performed |
| 120° F. | 18+ | not performed |
| 140° F. | 20+ | 160 |
| 150° F. | 18+ | 280 |

The "+" after the thickening time entries indicates that the tests were terminated after the time indicated. Thus, the thickening time entry for each test constitutes a minimum thickening time. Compressive strength testing was not performed on the sample composition until the temperature reached 140° F.

The above example demonstrates that the cement compositions of the present invention are suitable for use in subterranean applications.

EXAMPLE 2

A test sample of a preferred embodiment of the cement compositions of the present invention was made. To prepare the sample, an unhydrated cement was prepared comprising 85% vitrified shale by weight and 15% hydrated lime by weight. The unhydrated cement was then hydrated by adding 64% water by weight of the unhydrated cement. The sample was then subjected to testing per API Specification 10-B. The calculated density of the sample was 12.65 lb/gallon. After 72 hours at 150° F., the compressive strength of the sample was 280 psi. This demonstrates that the cement compositions of the present invention are suitable for use in subterranean applications.

Therefore, the present invention is well-adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing in a subterranean formation comprising the steps of:
   providing a cement composition comprising:
      an unhydrated cement comprising hydrated lime and vitrified shale; and water;
   placing the cement composition into a subterranean formation; and allowing the cement composition to set.

2. The method of claim 1 wherein the cement composition further comprises a surfactant, a dispersant, an accelerator, microspheres, a retarder, a salt, mica, fiber, a formation conditioning agent, a weighting agent, fumed silica, bentonite, a fluid loss control additive, or a defoamer.

3. The method of claim 1 wherein the cement composition has a density in a range of from about 4 pounds per gallon to about 20 pounds per gallon.

4. The method of claim 1 wherein the water is present in the cement composition in an amount sufficient to form a slurry.

5. The method of claim 4 wherein the water is present in the cement composition in an amount in the range of from about 40% to about 90% by weight of the unhydrated cement.

6. The method of claim 1 wherein the vitrified shale is present in the cement composition in an amount sufficient to form calcium silicate hydrates.

7. The method of claim 6 wherein the vitrified shale is present in the cement composition in an amount in the range of from about 80% to about 95% by weight of the unhydrated cement.

8. The method of claim 1 wherein the hydrated lime is present in the cement composition in an amount sufficient to form calcium silicate hydrates.

9. The method of claim 8 wherein the hydrated lime is present in the cement composition in an amount in the range of from about 5% to about 20% by weight of the unhydrated cement.

10. The method of claim 1 wherein the cement composition further comprises an expanding additive.

11. The method of claim 1 wherein the cement composition has a 24 hour compressive strength of at least about 50 psi.

12. The method of claim 1 wherein the water is present in the cement composition in an amount in the range of from about 40% to about 80% by weight of the unhydrated cement; wherein the vitrified shale is present in the cement composition in an amount in the range of from about 85% to about 90% by weight of the unhydrated cement; wherein the hydrated lime is present in the cement composition in an amount in the range of from about 10% to about 15% by weight of the unhydrated cement; and wherein the cement composition has a density in the range of from about 8 lb/gallon to about 17 lb/gallon.

13. A cement composition comprising:
an unhydrated cement comprising hydrated lime and vitrified shale; and water.

14. The cement composition of claim 13 wherein the cement composition further comprises a surfactant, a dispersant, an accelerator, a retarder, a salt, mica, fiber, a formation conditioning agent, a weighting agent, microspheres, an expanding additive, fumed silica, bentonite, a fluid loss control additive, or a defoamer.

15. The cement composition of claim 13 wherein the cement composition has a density in a range of from about 4 pounds per gallon to about 20 pounds per gallon.

16. The cement composition of claim 13 wherein the water is present in the cement composition in an amount sufficient to form a pumpable slurry.

17. The cement composition of claim 16 wherein the water is present in the cement composition in an amount in the range of from about 40% to about 90% by weight of the unhydrated cement.

18. The cement composition of claim 13 wherein the vitrified shale is present in the cement composition in an amount sufficient to form calcium silicate hydrates.

19. The cement composition of claim 18 wherein the vitrified shale is present in the cement composition in an amount in the range of from about 80% to about 95% by weight of the unhydrated cement.

20. The cement composition of claim 13 wherein the hydrated lime is present in the cement composition in an amount sufficient to form calcium silicate hydrates.

21. The cement composition of claim 20 wherein the hydrated lime is present in the cement composition in an amount in the range of from about 5% to about 20% by weight of the unhydrated cement.

22. The cement composition of claim 13 having a 24 hour compressive strength of at least about 50 psi.

23. The cement composition of claim 13 wherein the water is present in the cement composition in an amount in the range of from about 40% to about 80% by weight of the unhydrated cement; wherein the vitrified shale is present in the cement composition in an amount in the range of from about 85% to about 90% by weight of the unhydrated cement; wherein the hydrated lime is present in the cement composition in an amount in the range of from about 10% to about 15% by weight of the cement composition; and wherein the cement composition has a density in the range of from about 8 lb/gallon to about 17 lb/gallon.

24. A cement composition for subterranean applications wherein the cement comprises water and an unhydrated cement comprising hydrated lime and vitrified shale, and wherein the cement develops a 24 hour compressive strength of at least about 50 psi.

25. The cement composition of claim 24 further comprising a surfactant, a dispersant, an accelerator, a retarder, a salt, mica, fiber, a formation conditioning agent, a weighting agent, microspheres, an expanding additive, fumed silica, bentonite, a fluid loss control additive, or a defoamer.

26. The cement composition of claim 24 having a density in a range of from about 4 pounds per gallon to about 20 pounds per gallon.

27. The cement composition of claim 24 wherein the water is present in the cement composition in an amount sufficient to form a pumpable slurry.

28. The cement composition of claim 27 wherein the water is present in the cement composition in an amount in the range of from about 40% to about 90% by weight of the unhydrated cement.

29. The cement composition of claim 24 wherein the vitrified shale is present in the cement composition in an amount sufficient to form calcium silicate hydrates.

30. The cement composition of claim 29 wherein the vitrified shale is present in the cement composition in an amount in the range of from about 80% to about 95% by weight of the unhydrated cement.

31. The cement composition of claim 24 wherein the hydrated lime is present in the cement composition in an amount sufficient to form calcium silicate hydrates.

32. The cement composition of claim 31 wherein the hydrated lime is present in the cement composition in an amount in the range of from about 5% to about 20% by weight of the unhydrated cement.

33. The cement composition of claim 24 wherein the water is present in the cement composition in an amount in the range of from about 40% to about 80% by weight of the unhydrated cement; wherein the vitrified shale is present in the cement composition in an amount in the range of from about 85% to about 90% by weight of the unhydrated cement; wherein the hydrated lime is present in the cement composition in an amount in the range of from about 10% to about 15% by weight of the unhydrated cement; wherein the cement composition has a 24 hour compressive strength of at least about 50 psi; and wherein the cement composition has a density in the range of from about 8 lb/gallon to about 17 lb/gallon.

* * * * *